April 28, 1970 A. M. APICELLA, JR., ET AL 3,509,545

METHOD TO EFFECT MAGNETIC READ-ONLY IN A MEMORY

Filed July 25, 1966 2 Sheets-Sheet 1

INVENTORS
ANTHONY M. APICELLA JR.
BENGT H. HELLMAN
BY: Oldham & Oldham
ATTORNEYS

METHOD TO EFFECT MAGNETIC READ-ONLY IN A MEMORY

Filed July 25, 1966 2 Sheets-Sheet 2

INVENTORS
ANTHONY M. APICELLA JR.
BENGT H. HELLMAN
BY: Oldham & Oldham
ATTORNEYS United States Patent Office 3,509,545
Patented Apr. 28, 1970

3,509,545

METHOD TO EFFECT MAGNETIC READ-ONLY IN A MEMORY

Anthony M. Apicella, Jr., Massillon, and Bengt Harry Hellman, Cuyahoga Falls, Ohio, assignors to Goodyear Aerospace Corporation, Akron, Ohio, a corporation of Delaware Filed July 25, 1966, Ser. No. 567,552
Int. Cl. G11c *17/00*
U.S. Cl. 340—174 4 Claims

ABSTRACT OF THE DISCLOSURE

The invention relates to a method to effect magnetic read-only in a memory. A conventional toroidal memory unit is associated with selectively magnetized plates. Every core in the memory unit is set in the same magnetic direction. The external magnetic fields enhance interrogation so that readout is non-destructively accomplished for only the selectively magnetized areas of the magnetic plates. The magnetic plates can be selectively introduced as different programming operations are desired or deemed necessary by the memory unit. The method operates with extremely high signal to noise ratios, low power requirements, and shortened response times.

The general object of the invention is to increase the speed and reduce the size and cost of semi-permanent read-only memories by producing read-only memories with high signal to noise ratios and in which the memory content may be rapidly and selectively altered.

The object of the invention is achieved by providing a method to effect magnetic read-only in a memory which comprises the steps of arranging magnetic cores having axes in the memory in aligned columns and rows as a matrix, setting all the cores in the memory to the same magnetic state, selectively positioning an external magnetic field adjacent to certain portions of certain of the cores substantially perpendicular to the axes of the cores, sequentially non-destructively interrogating all cores by generating a solenoid magnetic field around the cores directed in substantially parallel relation to the external magnetic field, and simultaneous to said interrogation sensing flux change of a predetermined minimum amount in all interrogated cores.

For a better understanding of the invention, reference should be had to the accompanying drawings wherein.

Figure 1:
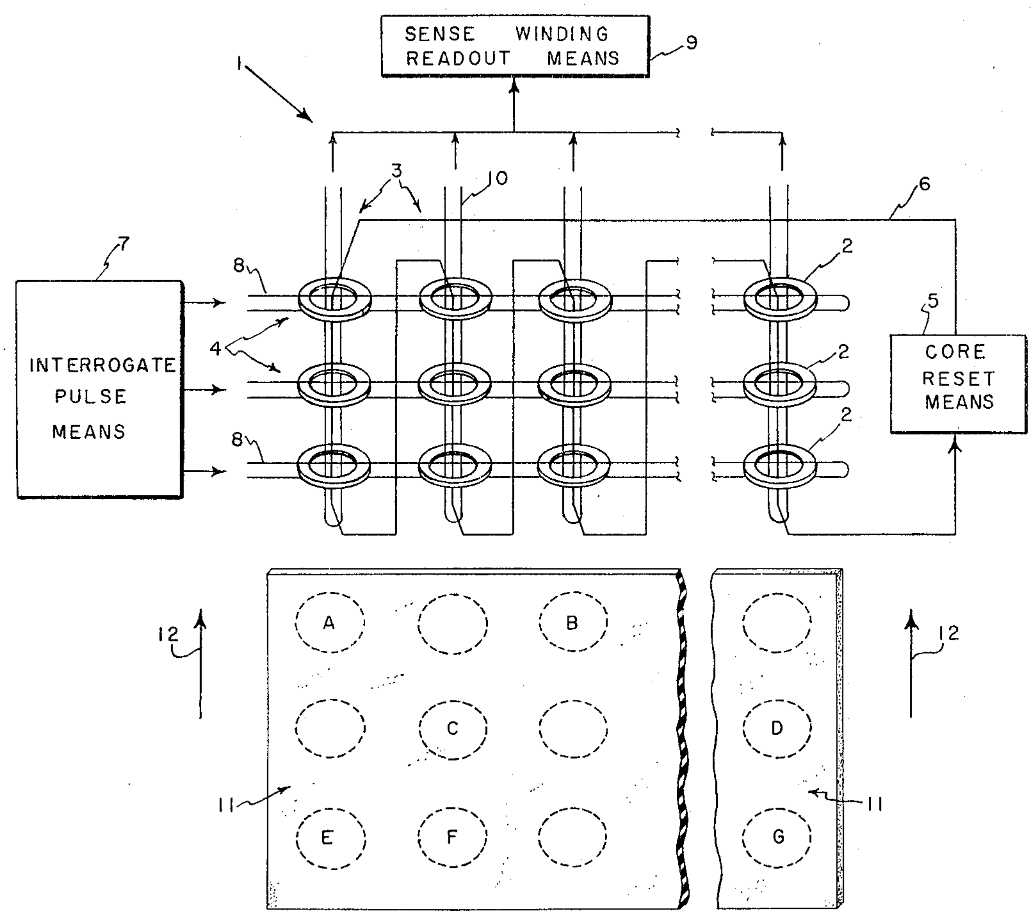
FIG. 1 is a schematic illustration, partially broken away, and in perspective, showing the aligned relationship of the cores and the selectively magnetized areas of a sheet which represents a preferred embodiment of the invention.

With reference to the form of the invention illustrated in the drawings, and more particularly to FIG. 1, the numeral 1 indicates generally a memory unit which comprises a plurality of toroidal magnetic cores 2 arranged in vertically directed columns 3 and horizontally directed rows 4. This arrangement, well known in the art of digital computers, then represents a bit of information stored as a flux pattern in each core 2 with all of the bits in each respective row 4 taken together representing a word stored in memory. Naturally, it should be understood that there may be many planes of cores comprising their own respective columns and rows, and also aligned with their respective cores in adjacent planes. The cores 2 are normally made of a square hysteresis loop magnetizable material whereby magnetic flux paths can encircle the single aperture through the core to represent digitally ones or zero depending upon the direction of saturation of the flux path around the core.

Thus, in order to set and interrogate the cores, the invention contemplates that suitable wiring will encompass the cores and be adapted to carry current for setting the respective flux paths. Specifically, a core reset means 5 directs current through an associated wire 6 which passes through each core 2 in the same direction so that a current pulse through the wire 6 will saturate each core 2 in exactly the same direction of magnetization. This is not the set up normally used in conventional digital memory storage units, but is suitable for the purposes of the invention, as will be more fully described hereinafter.

In order to read out the cores, an interrogate pulse means 7 is adapted to provide current pulses through respective solenoid type interrogate windings 8 associated with each row 4 of the cores 2. This is the conventional type cross field read out technique well known to achieve a non-destructive read out of toroidal cores, as more particularly pointed out in patent application Ser. No. 387,824, now Patent No. 3,465,318 assigned to Goodyear Aerospace Corporation.

Again, as well known in the art, in order to sense any flux changes in the core, a sense winding read out means 9 is associated with individual sense windings 10 surrounding a portion of each core 2 and running in a direction so as to be substantially perpendicular to the interrogate windings 8. In this manner, the sense windings surround the portions of the core 2 which are substantially perpendicular to the magnetic field generated by a current pulse passed through the interrogate windings 8, again all as well known by those skilled in the art.

Figure 3:
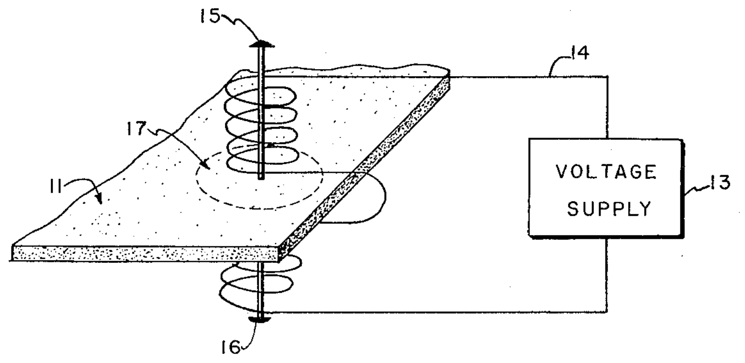
FIG. 3 is a perspective schematic illustration of how the localized areas of magnetization in the sheet may be achieved.

In order to achieve the objects of the invention, a sheet 11 of magnetizable material is selectively magnetized at certain portions A through G to correspond in position to respective cores 2 when the sheet 11 is moved as indicated by arrows 12 so as to be in adjacent relationship to the uniformly arranged cores 2 with the axes of the cores substantially parallel to the flat substantially planar surface of the sheet 11. The magnetization of the areas A through G may be achieved by a suitable arrangement such as that shown in FIG. 3 where a voltage supply 13 passes current through a wire 14 which is wrapped in solenoidal fashion around respective iron core pins 15 and 16 to create an electromagnetic field and thereby cause the localized magnetization of an area 17 through the magnetizable material 11. A suitable material which may be magnetized locally as indicated in FIG. 3 and shown in FIG. 1 would be for example a rubber based permanent magnetic material made by the Leyman Corp. of Cincinnati, Ohio. This type of localized magnetization has long been known and used in magnetic tape recording apparatus, and for other specialized uses.

Figure 2:
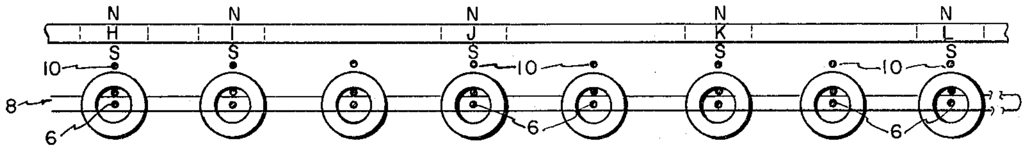
FIG. 2 is a cross sectional view of the cores and sheet of FIG. 1 in their properly arranged position illustrating the areas of selective magnetization in the sheet.

With the locally magnetized sheet 11 then positioned adjacent the cores 2, as indicated in FIG. 2, it is possible to obtain a read out on the respective sense winding 10 upon a sequential interrogation through the respective interrogation lines 8. Thus, assume for example that each of the locally magnetized areas are magnetized so as to have their north and south poles in the same directions, and that each of the cores 2 is magnetized in the clockwise direction, a detectable current on the respective sense windings 10 will only be associated with those respective cores 2 which are adjacent a locally magnetized area on the sheet 11. In FIG. 2, this would be areas H, I, J, K, and L, respectively. The reason that only the cores associated adjacent a locally magnetized area provide a read out is because of the solenoidal winding of the interrogate lines 8. Such cross field switching technique and read out with utilization of an external magnetic field is better explained in the above-identified prior patent application. It should be understood, however, that the external magnetic field should be directed substantially perpendicular to the normal flux pattern passing through that portion of the core surrounded by the sense windings, and thus also be substantially perpendicular to the axis of the core. Then, when the flux pattern in the portion of the core surrounded by the sense winding is altered by the current passed through the interrogate winding, this is amplified by the external magnetic field and a detectable read out is recognized on the sense winding. Such does not happen where no external magnetic field is associated with the respective core.

Thus, it becomes apparent that a simple changing of the sheet or plate 11 with previously prepared sheets each locally magnetized as necessarily selectively desired can immediately change the information carried by the memory unit. For example, suppose it was desired to program the launching of a missile, with each check-off meticulously followed and appropriately energized at the right time. One could conveniently control this programming by having each respective core represent some phase thereof, and the actuation of that particular core by its association with a localized magnetized area when sequentially energized with the proper interrogate pulse achieving an actuation of that particular sequence in the programming. Naturally, the particular sheet 11 with its selectively magnetized areas controls which cores are going to energize and provide the necessary and desired programming. Many other suitable uses could be made with this principle and structural apparatus.

Figure 4:
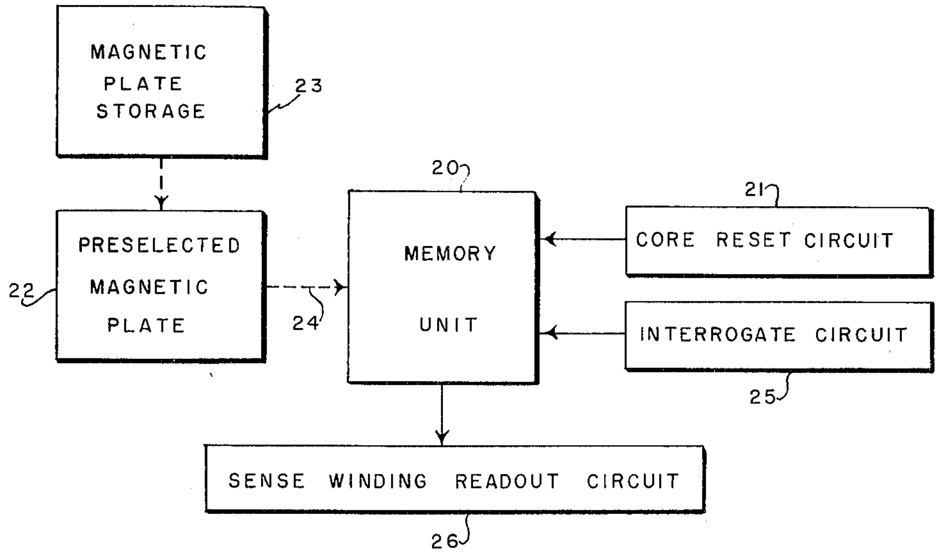
FIG. 4 is a block diagrammatic illustration of the components necessary to achieve the desired memory operation.

FIG. 4 represents in schematic block diagram form the desired sequence of operations. More specifically, a memory unit 20 comprising many, many cores arranged in columns, rows and respective planes is first energized through the core reset circuit 21 to set each of the cores in a uniform saturation flux state. Then, a particular preselected magnetic sheet or plate 22 picked from a plurality of such plates located in a magnetic plate storage 23 is inserted into the memory unit 20 as indicated by dotted line 24. Naturally, if the memory unit 20 contains several planes of cores, a separate magnetic plate 22 will have to be associated with each plane. Then, as desired, the interrogate circuit 25 sequentially pulses each of the interrogate lines associated with the respective rows of cores, while simultaneously the sense winding read out circuit 26 senses which cores provide read out, and it is this sense pulse which may be used for programming, triggering, or energizing appropriate equipment in accordance with the information stored on the preselected magnetic plate 22, or plates as the case may be.

Thus, it is seen that the invention consists of an array of conventional ferrite computer cores with suitable windings in a selectively magnetized permanent magnetic sheet or plate. The permanent magnet is selectively magnetized so that only the regions above the cores which are to induce detectable signals on the respective sense windings are magnetized. The interrogate windings are then activated sequentially with the sense windings sensed in parallel, or for each of the respective bit aligned columns of cores.

What is claimed is:

1. A method to effect magnetic read-only in a memory which comprises the steps of:

(1) arranging magnetic cores having axes in the memory in aligned columns and rows as a matrix, (2) setting all the cores in the memory to the same magnetic state, (3) sequentially non-destructively interrogating all cores by generating a solenoid magnetic field around the cores directed in substantially perpendicular relation to the core axes, (4) enhancing readout of selected cores by positioning a separate external magnetic field adjacent and in substantially perpendicular relation to certain portions and the axis of said selected cores so as to be in parallel relation to the solenoid magnetic field associated therewith, and (5) simultaneous to said interrogation sensing the enhanced flux change in said certain portions of all interrogated cores.

2. A method according to claim 1 which achieves step (2) by threading a single wire in the same direction through every core in the memory unit, and pulsing a current therethrough to set each core in the same direction.

3. A method according to claim 1 where step (4) is achieved by selectively magnetizing spots on a ferrite sheet and positioning the sheet adjacent the matrix of cores so that the spots lie adjacent the predetermined cores.

4. A method according to claim 3 which includes providing a plurality of sheets and selectively utilizing the sheets one at a time as selectively desired.

References Cited

UNITED STATES PATENTS

| | | | |
|---|---|---|---|
| 3,214,741 | 10/1965 | Tillman | 340—174 |
| 3,298,005 | 1/1967 | Matick | 340—174 |
| 3,151,316 | 9/1964 | Bobeck | 340—174 |

FOREIGN PATENTS

| | | |
|---|---|---|
| 680,172 | 2/1964 | Canada. |

OTHER REFERENCES

Newman, Adaptive Logical Device, June 1961, IBM Technical Disclosure Bulletin, vol. 4, No. 1, pp. 58, 59.

BERNARD KONICK, Primary Examiner

K. E. KROSIN, Assistant Examiner